United States Patent
Von Spreckelsen et al.

(10) Patent No.: US 8,253,971 B2
(45) Date of Patent: *Aug. 28, 2012

(54) AUTOMATED PRODUCTION CONTROL METHOD

(75) Inventors: Meino Von Spreckelsen, Kiel (DE); Arne Schmidt, Altenholz (DE); Jan Hoppe, Probsteierhagen (DE); Andreas Koempe, Altwittenbeck (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/115,617

(22) Filed: May 25, 2011

(65) Prior Publication Data

US 2011/0222123 A1     Sep. 15, 2011

Related U.S. Application Data

(62) Division of application No. 11/732,077, filed on Apr. 2, 2007, now Pat. No. 8,045,213.

(30) Foreign Application Priority Data

Mar. 31, 2006  (DE) .................. 10 2006 015 465

(51) Int. Cl.
*G06K 15/00* (2006.01)
*G06F 3/12* (2006.01)
(52) U.S. Cl. ......... 358/1.18; 358/1.1; 358/1.9; 358/1.13
(58) Field of Classification Search .................. None
See application file for complete search history.

(56) References Cited

U.S. PATENT DOCUMENTS

| 6,373,584 | B1 | 4/2002 | Barney et al. |
| 6,705,229 | B2 | 3/2004 | Frankenberger |
| 2002/0096077 | A1 | 7/2002 | Frankenberger |
| 2004/0117399 | A1 | 6/2004 | Dittmar et al. |
| 2005/0028700 | A1* | 2/2005 | Hauck ........................ 101/483 |
| 2006/0054044 | A1 | 3/2006 | Gateaud et al. |

FOREIGN PATENT DOCUMENTS

| DE | 4329886 A1 | 3/1995 |
| DE | 4439986 A1 | 6/1995 |
| DE | 69416480 T2 | 9/1999 |
| DE | 102004033056 A1 | 2/2005 |
| EP | 1226942 A1 | 7/2002 |
| EP | 1466734 A2 | 10/2004 |
| GB | 2283834 A | 5/1995 |
| JP | 2001158082 A | 6/2001 |

* cited by examiner

*Primary Examiner* — Dov Popovici
(74) *Attorney, Agent, or Firm* — Laurence A. Greenberg; Werner H. Stemer; Ralph E. Locher

(57) ABSTRACT

In a method for operating at least one machine with a computer, it is possible for at least one task for the production of a printed product to be stored in the computer, which task is processed on the machine. Parameters for setting the machine are stored as parameter sets in templates and relate to one or more production steps. For the purpose of job-specific adaptation, the settings in the templates must be modified. On account of settings which have not been tried and tested and not proven worthwhile, costs arise in terms of quality; in addition the settings can be made only by specialized personnel. To increase quality and to allow less qualified personnel to operate the machines, a parameter set based on rough entered data is compared with templates and that a most similar template be used to set the production step or steps.

8 Claims, 3 Drawing Sheets

AUTOMATED PRODUCTION CONTROL METHOD

CROSS-REFERENCE TO RELATED APPLICATION

This is a divisional application of application Ser. No. 11/732,077, filed Apr. 2, 2007; the application also claims the priority, under 35 U.S.C. §119, of German patent application No. DE 10 2006 015 465.7, filed Mar. 31, 2006; the prior applications are herewith incorporated by reference in their entirety.

BACKGROUND OF THE INVENTION

Field of the Invention

The present invention relates to a method for operating at least one machine in the graphics industry with a computer, it being possible for at least one task for the production of a printed product to be stored in the computer, which task is processed on the at least one machine. The task includes at least one production step, and at least two templates are stored in the computer and these templates are parameter sets which have different settings of the at least one production step.

The production of products in the graphics industry requires accurate planning of the production process, since it is usual for a large number of machines processing printing materials and consumable materials to be needed during the production of such a product. This begins with the selection of the printing material, which can be obtained in many sizes, material compositions, colors, etc., proceeds via the choice of a suitable printing plate exposer with the selection of printing plates, screening methods and screening angles, and proceeds further via the selection of the suitable printing press on the basis of the printing format, the selected printing material, the necessary colors, etc. as far as further processing with folding machines and packaging machines. This enumeration is only a small selection of the possible production steps and of the possible task information, such as materials used and parameters to be set up within a production step, or the entire task for the production of the printed product. These parameters relate in particular to setting values of the machines and methods, for example calculations and conversions, which are necessary for the production step. The production sequence must therefore be analyzed and planned accurately in order that the necessary machines and consumable materials are present and the individual production steps can be carried out as satisfactorily as possible.

Machines in the graphics industry according to the prior art operate in accordance with a defined operating scheme, so that the operator has to make specific settings or entries during each print job. This applies to all the machines in the graphics industry, such as the plate exposers and the raster image processors in the prepress stage, the printing presses, the folding machines and the machines for packaging, as well as other further processing operations of printed products. Each print job normally passes through the three stations containing a prepress stage, a main printing stage and further processing. Here, the print job is either described in a conventional job docket or is guided through the individual processing stations as an electronic file in a type of virtual job docket. Depending on the print job, the operator then has to perform the necessary settings for the print job on the individual machines and to correct these settings if necessary in accordance with a proof that is made, so that the printed product ultimately corresponds to the printing original predefined by the customer.

This procedure is rather time-consuming and requires a great deal of printing art comprehension by the operator since, for example, he has to select characteristic curves for the inking unit of a printing press and to make further settings. In particular, operating personnel who have not been trained to become printers are overtaxed by the many and various settings of a printing press. In addition, the time factor plays a role which must not be underestimated in the graphics industry, so that time-consuming changeover actions between two print jobs, as are normally necessary nowadays, constitute a critical disadvantage in relation to the economy of the machines used.

Published, non-prosecuted German patent application DE 10 2004 033 056 A1, corresponding to U.S. patent disclosure No. 2005/0028700 A1, discloses a method for automating such a task for the production of a printed product. Such a task will also be designated a print job in the following text. In this case, it is not intended to describe the printing process alone but stands for the totality of all the production steps during the production of the printed product which are carried out within the range of action of the printer and, if appropriate, can be controlled jointly via a computer.

Published, non-prosecuted German patent application DE 10 2004 033 056 A1 then reveals a method which preferably runs as software on a computer which is able to communicate with the machine or the machines. The computer receives task data from the operator or from a task otherwise supplied and then performs all the settings which are needed for the print job. For this purpose, it makes access back to stored parameter sets from preceding print jobs. Should individual parameters not be stored, then the method calculates these automatically or requests further entry by the user.

Such stored parameter sets are designated templates. They are in each case assigned to one or more production steps and relate to the settings and materials to be used for this production step.

If, therefore, individual task information of a print job does not coincide with a stored template, then, in accordance with the method described here, the parameters which do not coincide or are not stored are newly calculated in a task-specific manner or the template is supplemented or changed in a task-specific manner by a user, so that the settings which are stored in the template correspond better to the new print job.

The problem with this method is that in this way new settings which are unchecked or not already tried and tested are used for the production of a job. For this combination of settings there is no experience in the corresponding operation as to whether they lead to a product having an acceptable quality.

SUMMARY OF THE INVENTION

It is accordingly an object of the invention to provide an automated production control method which overcomes the above-mentioned disadvantages of the prior art methods of this general type, which makes it possible, in a reliable and simple way, to produce a printed product in such a way that it comes as close as possible to given requirements.

With the foregoing and other objects in view there is provided, in accordance with the invention, a method for operating at least one machine in the graphics industry with a computer. The method includes storing at least two templates in the computer and the templates being parameter sets having different settings of at least one production step; and storing at least one task containing the at least one production step for producing a printed product in the computer by transmitting, in a first working step, task information to the computer of: parameters and/or boundary conditions of the at least one production step; and/or Intermediate products and/or a resultant printed product. In a second working step, the task information is used to form at least one predefined parameter set for the at least one production step. In a third working step, the predefined parameter set is compared with the parameter sets of the at least two templates and, for each of the templates, a similarity of its parameter set to the predefined parameter set is determined, if the predefined parameter set is not identical to any of the parameter sets of the templates. In a fourth working step, a template with a most similar parameter set is used for an automated setting and performance of the at least one production step for processing on the at least one machine.

In a first working step, task information about parameters and/or boundary conditions of the at least one production step and/or task information about intermediate products and/or the resultant printed product is transmitted to a computer. In this case, for example, this can be any desired production step for the production of the printed product. For example, it can be printing plate exposure or sheet folding. In order to carry out the production step, the use of an appropriate machine, for example printing plate exposer or sheet folding machine, is then necessary. This machine must be set up appropriately, i.e. necessary parameters must be transmitted. Here, these parameters are dependent on the underlying materials, that is to say for the end product or for intermediate products.

In a second working step, the task information is used to form at least one predefined parameter set for the at least one production step.

In a third working step, the predefined parameter set is compared with the parameter sets of at least two templates and, for each template, the similarity of its parameter set to the predefined parameter set is determined.

In general, a plurality of templates is installed for each production step. These templates in each case contain a complete parameter set for setting machines and for carrying out the production step. In this case, in particular boundary conditions such as the utilization of the machine capacities and savings of working steps can also be taken into account. The templates in each case also include necessary or desired materials for the production step.

These templates have been stored in the computer. There is therefore the possibility that only tested templates, which ensure particularly good and in particular also reproducible quality of the printed product, are stored for this purpose. Furthermore, they can contain detailed information which ensures that material can be saved and the sequences can be accelerated.

If the predefined parameter step is not identical with any parameter set of the templates, in a fourth working step it is precisely that template with the most similar parameter set which is used for the automated setting and performance of the at least one process step.

If the task information contains all the parameters of a template, then it is exactly this template which is used in order to control at least this production step. In general, however, first of all not all the existing parameters of the templates are transmitted by the task information. Furthermore, in the parameters of the task information which are transmitted, it is possible for deviations from the parameters of the templates to occur. This means that the predefined parameter set for this production step differs from the parameter sets of the templates. The fact that the most similar template is now selected in order to control the at least one production step ensures that a reproducible quality of the product is achieved, since this template should have been predefined by a specialist or at least, according to experience, produces a high-quality product. A reproducible result is therefore achieved.

Of course, provision can also be made for individual templates or all the templates to contain a plurality of production steps or for a plurality of templates to be combined to form a template group and in this way form common parameter sets which result from the combination of the individual parameter sets.

Individual possible production steps are:
data acceptance for the printed content (e.g. pages of a brochure),
data preparation for the print,
outputting the data on paper and initialing by the client (what is known as the proof cycle),
distributing the printed content to a plurality of printed sheets (what is known as imposing),
outputting the planned printed sheets on paper (what is known as a sheet proof),
outputting the printing plates needed for the printing (plate exposure),
printing the printed sheets on one or various available printing presses,
cutting the printed sheets,
folding the printed sheets,
binding the printed sheets to make the end product,
packaging the products, and
delivering the products.

Materials which can be taken into account in the templates are, for example:
printing plates,
papers for the printing, and
inks for the printing.

Each of the production steps has many variations, requisite settings and aids, etc., which have to be defined in accordance with the available production measures and in accordance with the task. All this can then advantageously be taken into account in the stored templates.

In an advantageous further development, provision is made for the predefined parameter set to contain fewer parameters than or as many parameters as the parameter sets of the templates. In this way, by a rough predefinition which contains only some of the possible parameters, a print job can already be predefined in such a way that a similar template and therefore a reproducible product that is as good as possible is achieved.

In a particularly advantageous development, provision is made for at least one parameter to be identified as mandatory and for a template to be used for the automated setting and performance of the at least one process step only if the corresponding parameter of the predefined parameter set coincides with the parameter of the template. These mandatory parameters make it possible for the most important characteristics of a printed product actually to be fulfilled. For example, it may be the case that it is not so relevant to the quality of the product whether a specific region of the printing original was screened with a quite specific screen but, for example, the format of the end product is a considerably more important point specifically for the client of the print job. Then, as opposed to the screen, the format would be a mandatory parameter. Only templates which coincide with the predefined parameter set in this or in these parameters can be selected. In particular, it can also be possible that a mandatory parameter must be transmitted by the predefined parameter set at all in order to permit a selection of the template.

In this case, mandatory can also be understood as a limiting value which must be set up by the predefined parameter set and must not be exceeded or undershot by the relevant parameter of the template to be selected. This can be, for example, the size of a printing plate. This must be larger than the printing original; on the other hand, a template which has too small a printing plate for the printing original cannot be selected.

In a further development or alternative embodiment, provision is made for parameters to be weighted with weighting factors and for the similarity of a parameter set of a template to the predefined parameter set to be determined while taking account of the weighting factors of coincident parameters. In this way, the importance of specific predefinitions can be determined. The dot size during screening can, for example, be more important than the screen size or vice versa. Depending on this, an order can then be formed among the parameters and the template is then selected which has more important or overall more important parameters coinciding with the predefined parameter set.

In a further development or alternative embodiment, provision is made for the similarity of the parameter sets to be determined while taking into account the number of coincident parameters. Beneficially, in this way templates which have the most numerous coincidences with the predefined parameter sets are intended to be determined.

In conjunction with the weighting factors, however, templates with numerically fewer coincidences can also be selected, since these coincide with the predefined parameter set in terms of more important parameters.

In particular in the case of two or more templates which have the same number of coincident parameters with the predefined parameter set, the weightings of the coincident parameters can decide which template is determined as being the most similar and ultimately used. This can be stored in the form of an order of priority. This order of priority can also be stored in addition to the first weighting factors. Thus, two mutually independent weightings of the parameters can be provided to be taken into account during the determination of the most similar template.

Since, in the case of individual parameters, tolerances are possible within which fluctuations have no effect on the quality, it is advantageously possible in particular for tolerances within which coincidences are detected to be defined for individual parameters.

In a particularly advantageous further development, provision is made for a plurality of process steps to be carried out for the production of the printed product, for task information which describes the important characteristics of the printed product and the substantial production sequence to be transferred to the computer, and, for each of the process steps, for a predefined parameter set to be created on the basis of the task information, the predefined parameter set describing the important sequence of the respective process step.

The important characteristics and the important sequence of the respective production steps are then advantageously predefined in this way by the data of the printing process that is transmitted to the computer. If, then, for each production step, a suitable, that is to say similar, template is selected, then it is first ensured that it corresponds substantially to the desired printed product, and second, has a reproducible quality, since only tested templates are used for its production. Under certain circumstances, although some characteristics of the configured product are not achieved, the quality will always correspond to a certain standard. As a result of predefining important features of the product, in particular by using mandatory features or parameters and weighting factors, it is possible for a coincidence between the printed product actually produced with the desired product to be achieved in essence, that is to say specific features.

In order also to permit the processing of print jobs for which no suitable template, that is to say no similar template, has been found, provision is advantageously made in a further development for a notification to be produced if, for a process step, it is not possible to determine any template which contains a similar parameter set to the predefined parameter set, and for at least this process step not to be carried out until a template with a similar parameter set has been stored in the computer. According to the invention, provision can be made for a template to be selected for which a minimum number of parameters have to be modified in order to achieve a similar template. These parameters can then either be changed or supplemented by hand or these changes can be calculated.

Other features which are considered as characteristic for the invention are set forth in the appended claims.

Although the invention is illustrated and described herein as embodied in an automated production control method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
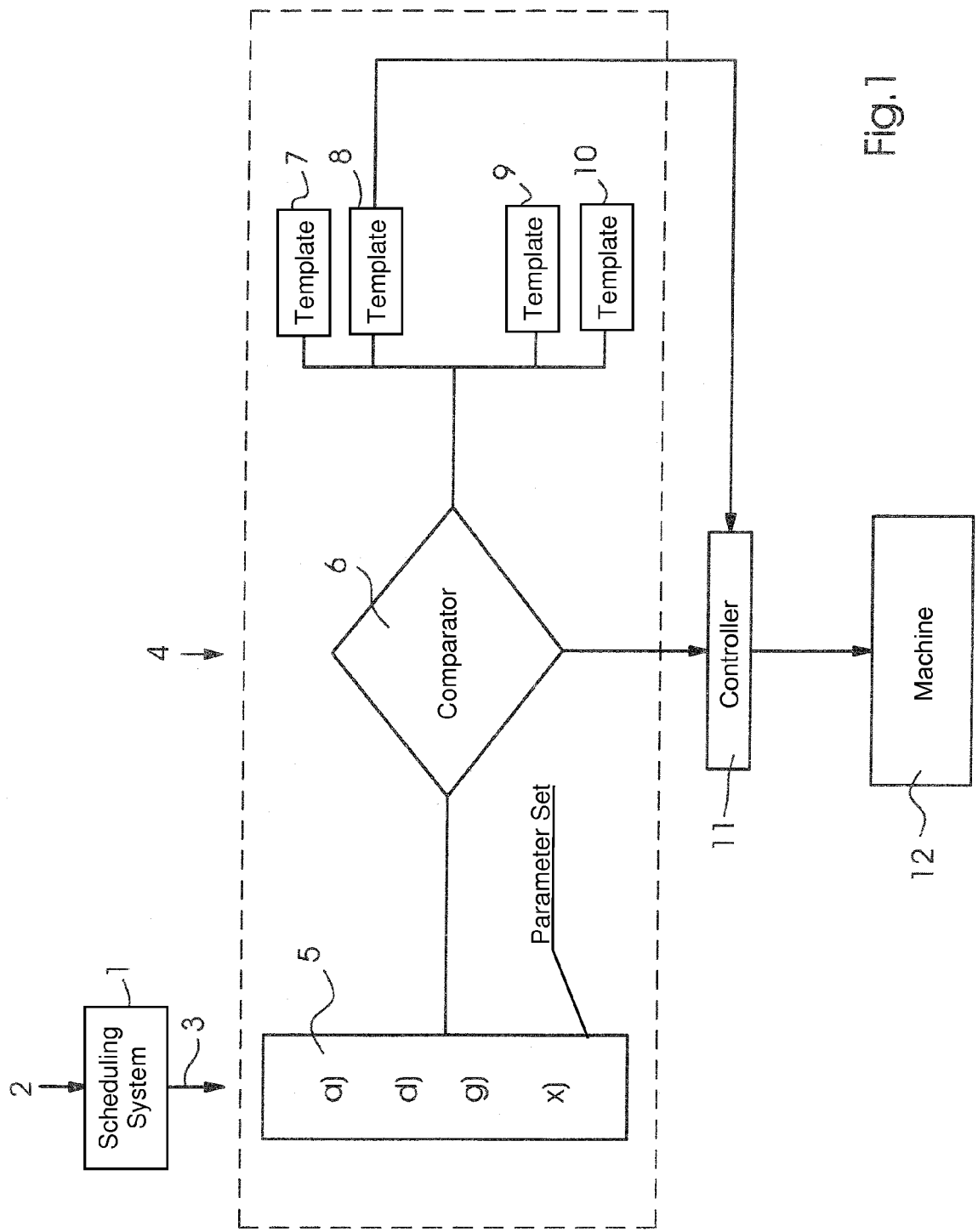
FIG. 1 is a block diagram of a basic production sequence for the production of a printed product according to the invention.

Referring now to the figures of the drawing in detail and first, particularly, to FIG. 1 thereof, there is shown a production sequence from an entry of rough data in a scheduling system 1 as far as the production of a product or an intermediate product by a machine 12. In the preparation of the work for the production of the product, sequences are planned and boundary conditions are predefined. This is done in the scheduling system 1, also called a management information system MIS. Here, the rough data 2 is entered into the system without any concrete knowledge relating to the production conditions being necessary or available.

The rough data 2 is transmitted as task information 3 to a production system 4. The production system 4 is implemented in software. The production system 4 produces a predefined parameter set 5 having the predefined parameters a), d), g), x). These can relate, for example, to a selected machine type, a format to be processed or a desired color.

A comparator 6 of the production system 4 compares the parameter set 5 with parameter sets of stored templates 7, 8, 9, 10. Here, the template 8 is detected as the most similar template. This information is transmitted to a controller 11. The controller 11 will drive the machine 12 which is responsible for the relevant production step only by the predefinitions of the most similar template 8. The original predefined parameters a), d), g), x) of the predefined parameter set 5 then no longer play any part.

Since the template 8 has been predefined in such a way that it permits a high quality of the end product, a high-quality product is achieved. The templates 7-10 can be predefined at the same time of the installation of the production system 4 and can have been produced by trained personnel. Furthermore, additional templates which have proven worthwhile for the given boundary conditions can be stored by specialist staff belonging to the printing plant. It is also possible for new templates to be transmitted into the production system 4 from outside, irrespective of previous applications of the production system 4. This can be done in particular by updates to the software, in particular via a network, a data storage medium or the Internet. In this way, more and more templates 7-10 can be stored which always correspond more accurately to the requirements of the task information 3 and at the same time ensure a predefined quality. In this case, the templates 7-10 are themselves in particular not manipulated in a job-specific manner and always ensure a reproducible result which, in particular, has already proven worthwhile in production.

The specialist requirements on the operating personnel of the production system 4 are reduced sharply by the fact that there is no longer any necessity to modify or to produce settings in a job-specific manner, which can be done only by specialized personnel.

One example for a template 7-10 is the entire parameter set which an output system (RIP) having a connected plate exposer needs in order to output a plurality of pages as a separate plate set for the printing of a printed sheet. Contained in the parameter set are, for example, screen system, dot shape, screen frequency, plate material to be exposed, calibration settings to be used, etc. Only some of these parameters are predefined by the task information; a tried and tested template 7-10 is selected which is most similar to the parameter set 5 produced by the task information 3.

Figure 2:
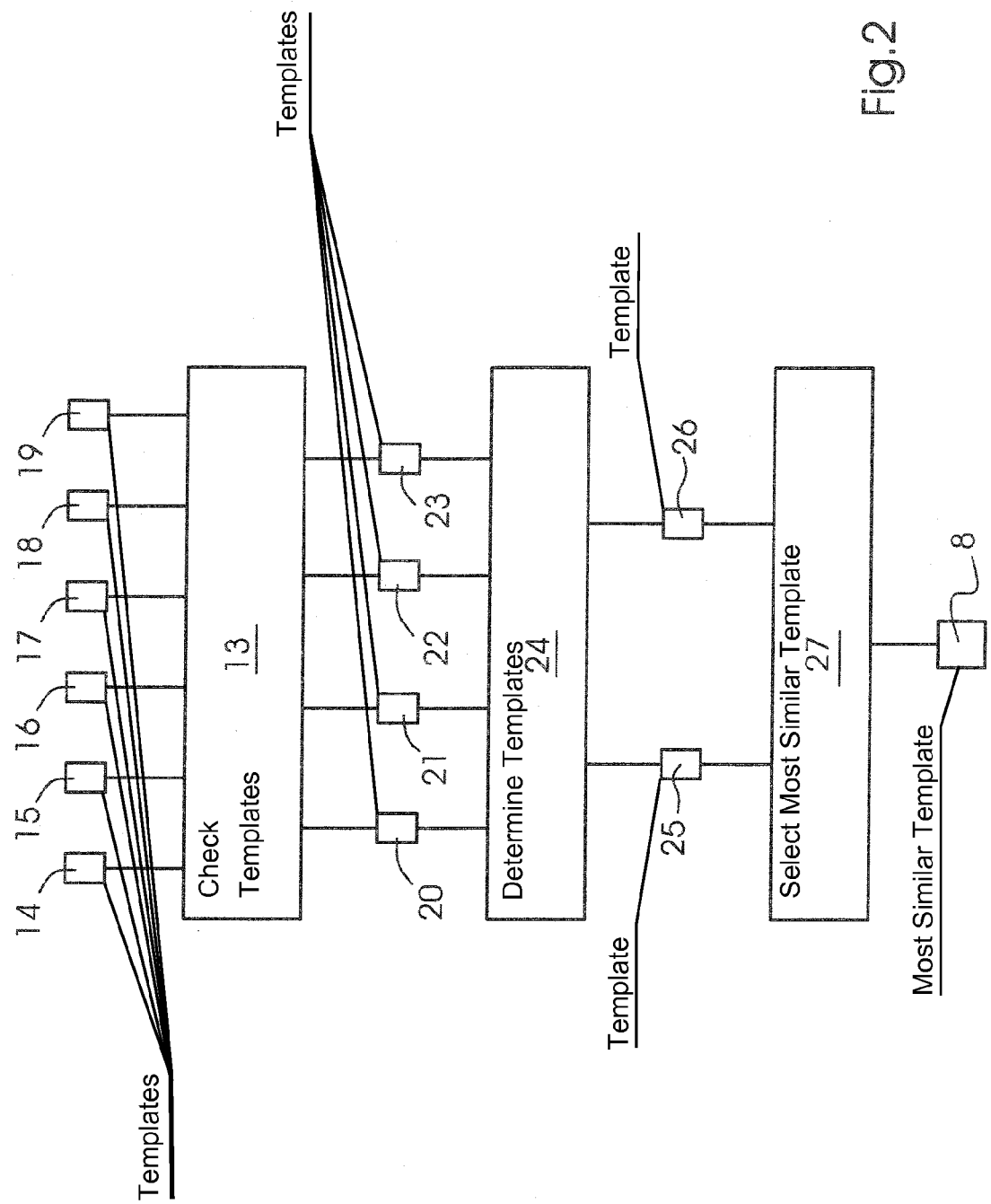
FIG. 2 is an illustration showing a selection method for determining a most similar template.

FIG. 2 shows a selection method for a most similar template 8 according to FIG. 1. First, in a step 13, all the templates 14-19 stored in the production system 4 are checked to see whether mandatory parameters are present and which templates coincide with the predefined parameter set 5 in all the mandatory parameters. In the example, the templates 20-23 are selected which coincide with the predefined parameter set 5 in all the mandatory parameters. Here, coincide also means in particular the case in which the parameters lie within a tolerance band or are greater or less than the predefined parameters if the parameter is stored as a limiting value.

In the following step 24, the templates 25, 26 which in each case have the greatest number of coincident parameters with the predefined parameter set 5 are then determined. Here, coincidence is to be understood as described above.

In a subsequent step 27, the most similar template 8 is primarily selected from the previously determined templates 25, 26 with an equal number of coincidences. This is done on the basis of weightings of the individual parameters. Different weighting factors are assigned to the parameters.

The selection of the most similar template 8 can then be carried out in various ways.

In a first embodiment, the weighting factors of the coincident parameters of the previously selected templates 25, 26 are added and the template 8 having the highest sum is selected.

In a second embodiment, the template 8 which, on its own, has the parameter with the highest weighting factor coinciding with the predefined parameter set is detected as the most similar template. This can also additionally be done in accordance with a method as in the first embodiment.

Figure 3:
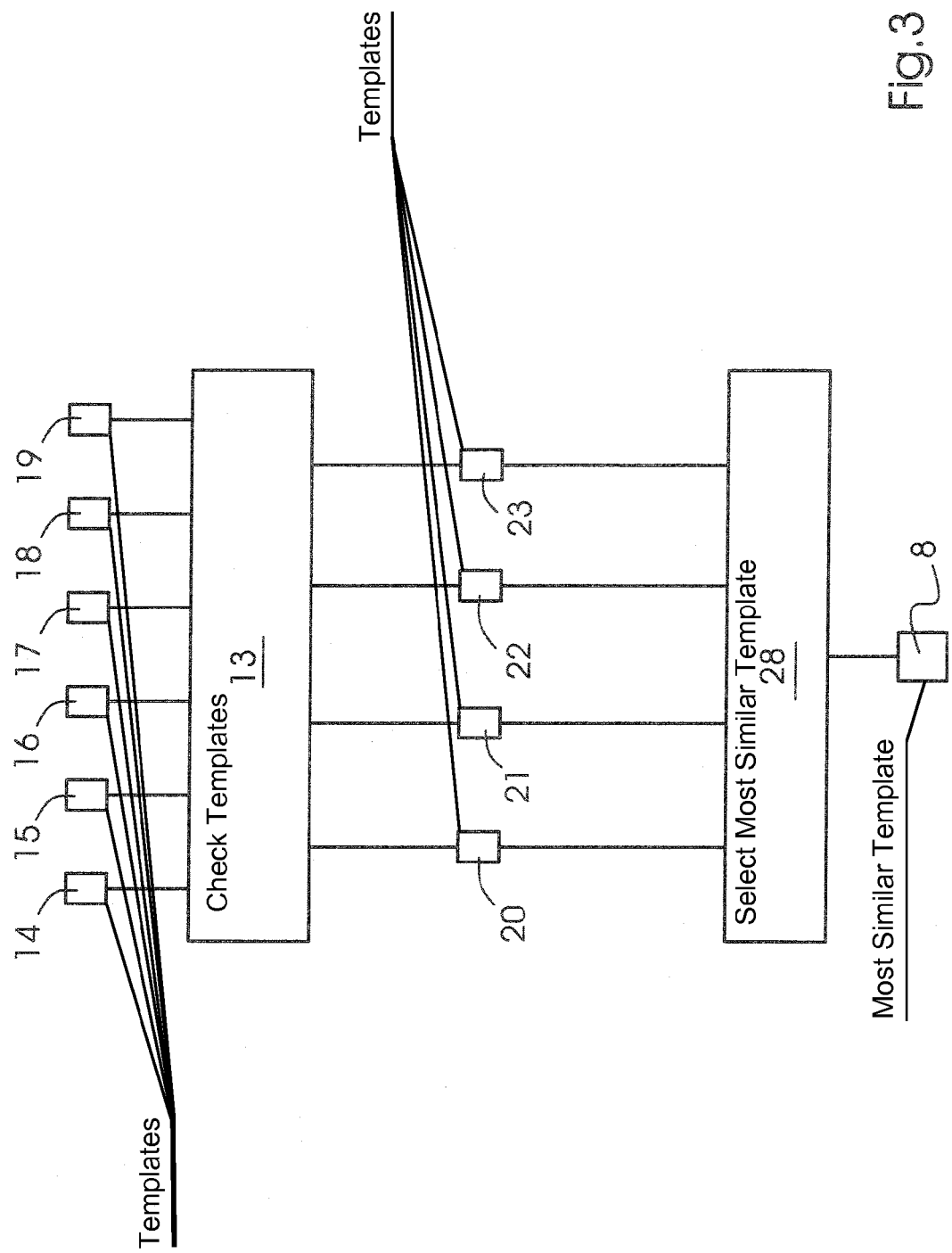
FIG. 3 is an illustration showing a further selection method for determining the most similar template.

A further preferred embodiment is illustrated in FIG. 3. Identical designations designate identical steps and elements to those in the previous figures. The selection method illustrated here corresponds to that described in FIG. 2. Here, step 27 is omitted.

In step 28, which replaces steps 24 and 27 of FIG. 2, the most similar template is finally selected from the previously determined templates 20-23. This is done on the basis of weightings of the individual parameters and the coincidence. Different weighting factors are assigned to the parameters. Here, the counting of coincidences and the weighting is carried out in step 28.

In this embodiment, the weighting factors of the coincident parameters of the previously selected templates 20-23 are added and the template 8 having the highest sum is selected.

In a fourth embodiment, which is a special case of the second and third embodiment and is preferred, each weighting factor is allocated only once and in this way an order of priority of the parameters is produced. Then, on the basis of the highest priority parameter, it is determined whether there is a template which has no coincidence in this parameter with the predefined parameter set 5 while there are other templates which still have a coincidence. If this is the case, then the relevant template without coincidence is discarded. The parameters are therefore checked in this order and templates are discarded until there is only one template 8 left. This template is then the template with the greatest similarity with the predefined parameter set 5 and is used to drive the machine 12 as described in relation to FIG. 1.

In this way, a tried and tested template which has been proven to produce a high-quality product is always used to drive the machine 12. This template has been created by specialists and could preferably already have been checked. A user who has no background knowledge about the process sequence can then produce a high-quality product, which coincides with the requirements in terms of mandatory features and is most similar to the desired end product in terms of the most important features, merely by storing the rough data 2 in a scheduling system 1 for a printing system.

The invention claimed is:

1. A method for operating at least one machine in a graphics industry with a computer, which comprises the steps of:
storing at least two templates in the computer and the templates being parameter sets having different settings of at least one production step;
storing at least one task containing the at least one production step for producing a printed product in the computer by transmitting, in a first working step, task information to the computer of at least one of:
parameters and/or boundary conditions of the at least one production step, and
intermediate products and/or a resultant printed product;
using, in a second working step, the task information to form at least one predefined parameter set for the at least one production step;
comparing, in a third working step, the predefined parameter set with the parameter sets of the at least two templates;
determining a similarity of a parameter set of a template to the predefined parameter set for each of the parameter sets of the templates not identical to the predefined parameter set;
using, in a fourth working step, a template with a most similar parameter set for an automated setting and performance of the at least one production step for processing on the at least one machine; and using only the template with the most similar parameter set without manipulation of the template in a task-specific manner for controlling the at least one machine.

2. The method according to claim 1, wherein the predefined parameter set contains fewer parameters than or as many parameters as the parameter sets of the templates.

3. The method according to claim 1, which further comprises:

identifying at least one parameter of the predefined parameter set as being a mandatory parameter; and using the template for the automated setting and performance of the at least one production step only if the mandatory parameter of the predefined parameter set coincides with a parameter of the template.

4. The method according to claim 1, which further comprises:

weighting parameters with weighting factors of coincident parameters; and determining the similarity of the parameter set of the template to the predefined parameter set by taking into account the weighting factors of the coincident parameters.

5. The method according to claim 1, which further comprises determining the similarity between the parameter set and the predefined parameter set by taking into account a number of coincident parameters.

6. The method according to claim 3, which further comprises for individual parameters of the predefined parameter set, detecting a coincidence when a parameter of the template lies within a predefined tolerance band of a corresponding parameter of the predefined parameter set.

7. The method according to claim 1, which further comprises:

carrying out a plurality of production steps for producing of the printed product;

transferring the task information describing critical characteristics of the printed product and a substantial production sequence to the computer; and creating, for individual ones of the production steps, the predefined parameter set on a basis of the task information, and the predefined parameter set describing an important sequence of a respective production step.

8. The method according to claim 7, which further comprises producing a notification if, for the respective production step, it is not possible to determine any template which contains a similar parameter set to the predefined parameter set, and at least the respective production step is not carried out until the template with the most similar parameter set has been stored in the computer.

* * * * *